United States Patent
Uchino et al.

(10) Patent No.: US 9,398,522 B2
(45) Date of Patent: Jul. 19, 2016

(54) MOBILE STATION, SMALL RADIO BASE STATION, AND COMMUNICATION CONTROL METHOD

(71) Applicant: NTT DOCOMO, INC., Tokyo (JP)

(72) Inventors: Tooru Uchino, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/416,368

(22) PCT Filed: Jul. 17, 2013

(86) PCT No.: PCT/JP2013/069409
§ 371 (c)(1),
(2) Date: Jan. 22, 2015

(87) PCT Pub. No.: WO2014/017353
PCT Pub. Date: Jan. 30, 2014

(65) Prior Publication Data
US 2015/0181508 A1    Jun. 25, 2015

(30) Foreign Application Priority Data
Jul. 27, 2012    (JP) .................. 2012-167507

(51) Int. Cl.
*H04W 48/16* (2009.01)
*H04W 16/32* (2009.01)

(52) U.S. Cl.
CPC .............. *H04W 48/16* (2013.01); *H04W 16/32* (2013.01)

(58) Field of Classification Search
CPC ............................. H04W 48/16; H04W 16/32
See application file for complete search history.

(56) References Cited

U.S. PATENT DOCUMENTS

| | | | |
|---|---|---|---|
| 8,274,947 B1 * | 9/2012 | Fang et al. | 370/331 |
| 2011/0003597 A1 * | 1/2011 | Budic et al. | 455/450 |
| 2011/0128916 A1 * | 6/2011 | Kwon et al. | 370/328 |
| 2012/0258716 A1 * | 10/2012 | Ahn et al. | 455/436 |

OTHER PUBLICATIONS

International Search Report for corresponding International Application No. PCT/JP2013/069409, mailed Aug. 13, 2013 (1 page).
Written Opinion for corresponding International Application No. PCT/JP2013/069409, mailed Aug. 13, 2013 (3 pages).
Yoshihisa K. et al.; "[Invited] LTE Small Cell Enghancements and Phantom Cell Concept;" IEICE Technical Report RCS2012-332; Feb. 20, 2013 (22 pages).
TSG-RAN Chairman; "Summary of 3GPP TSG-RAN Workshop on Release 12 and Onward;" 3GPP Workshop on Release 12 Onward, RWS-120045; Ljubljana, Slovenia; Jun. 11-12, 2012 (6 pages).

(Continued)

*Primary Examiner* — Brandon Miller
(74) *Attorney, Agent, or Firm* — Osha Liang LLP

(57) ABSTRACT

A "macro-assisted cell" adaptable to multiple operation modes is realized. In a mobile station (UE) of the invention, a control unit (22) is configured to start communication in a small cell on the basis of MIB/SIB of the small cell when a sequence in a "discovery signal" is determined as a sequence for a "stand-alone cell." The control unit (22) is configured to start the communication in the small cell on the basis of a control signal from a macro cell when the sequence in the "discovery signal" is determined as a sequence for a "macro-assisted cell."

7 Claims, 14 Drawing Sheets

(56) References Cited

OTHER PUBLICATIONS

Nokia Siemens Networks et al.; "Background search for small cell detection;" 3GPP TSG-RAN WG2 Meeting #78, R2-123102; Prague, Czech Republic; May 21-25, 2012 (11 pages).

NTT Docomo, Inc.; "Requirements, Candidate Solutions & Technology Roadmap for LTE Rel-12 Onward," 3GPP Workshop on Release 12 and onwards, RWS-120010; Ljuljana, Slovenia; Jun. 11-12, 2012 (27 pages).

* cited by examiner

FIG. 5
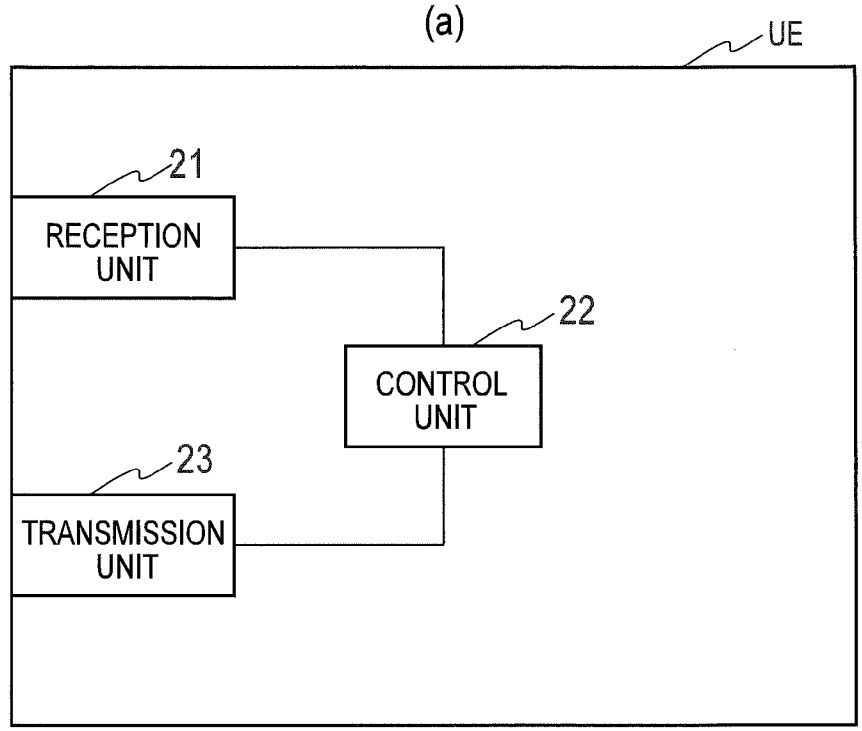
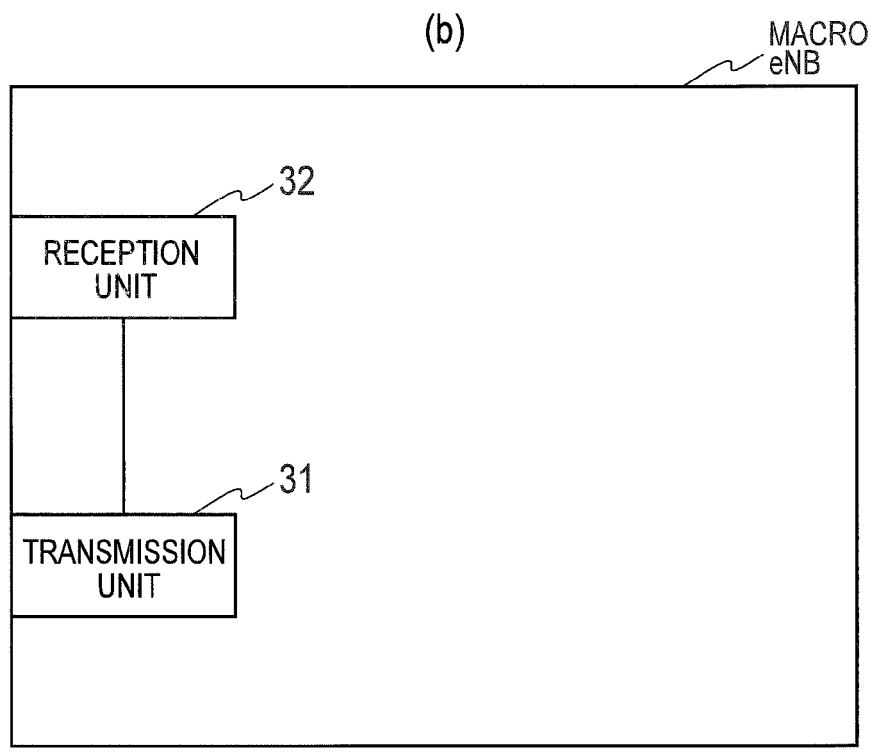

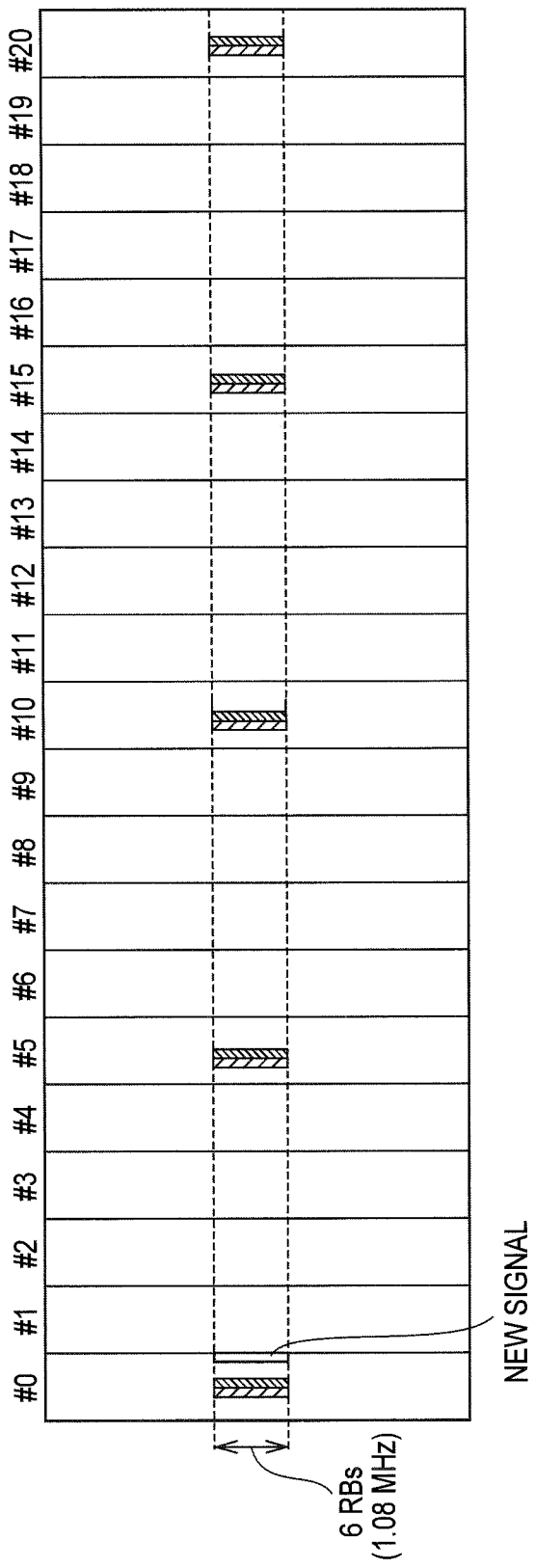

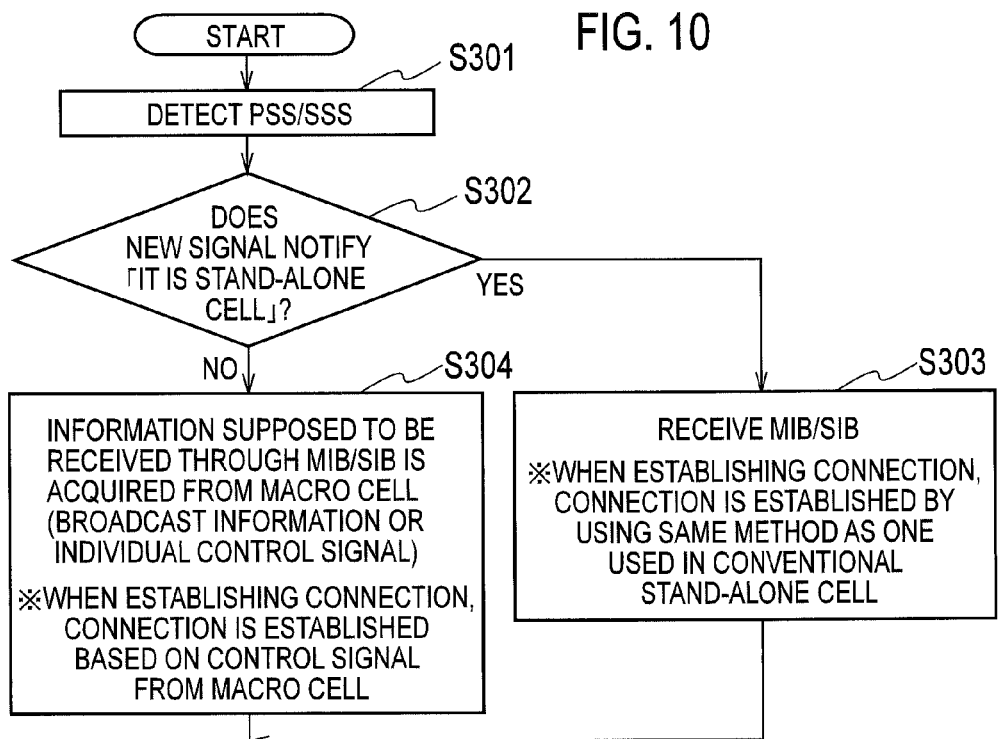
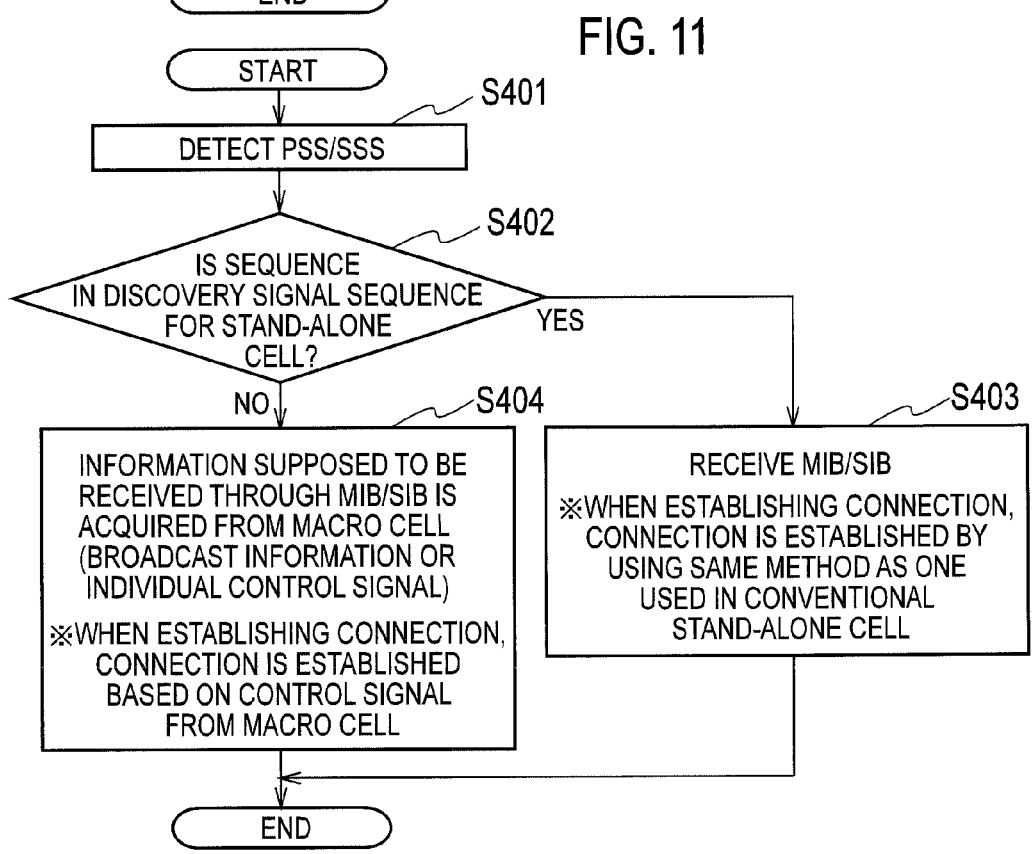

FIG. 15

*SystemInformationBlockType5 information element*

EXISTING SIB5

```
-- ASN1START

SystemInformationBlockType5 ::=      SEQUENCE {
    interFreqCarrierFreqList             InterFreqCarrierFreqList,
    ...,
    lateNonCriticalExtension             OCTET STRING        OPTIONAL    -- Need OP
}

InterFreqCarrierFreqList ::=         SEQUENCE (SIZE (1..maxFreq)) OF InterFreqCarrierFreqInfo InterFreqCarrierFreqInfo ::=         SEQUENCE {
    dl-CarrierFreq                       ARFCN-ValueEUTRA,
    q-RxLevMin                           Q-RxLevMin,
    p-Max                                P-Max                          OPTIONAL,   -- Need OP
    t-ReselectionEUTRA                   T-Reselection,
    t-ReselectionEUTRA-SF                SpeedStateScaleFactors         OPTIONAL,   -- Need OP
    threshX-High                         ReselectionThreshold,
    threshX-Low                          ReselectionThreshold,
    allowedMeasBandwidth                 AllowedMeasBandwidth,
    presenceAntennaPort1                 PresenceAntennaPort1,
    cellReselectionPriority              CellReselectionPriority        OPTIONAL,   -- Need OP
    neighCellConfig                      NeighCellConfig,
    q-OffsetFreq                         Q-OffsetRange                  DEFAULT dB0,
    interFreqNeighCellList               InterFreqNeighCellList         OPTIONAL,   -- Need OR
    interFreqBlackCellList               InterFreqBlackCellList         OPTIONAL,   -- Need OR
    ...,
    [[ q-QualMin-r9                      Q-QualMin-r9                   OPTIONAL,   -- Need OP
       threshX-Q-r9                      SEQUENCE {
                                             threshX-HighQ-r9           ReselectionThreshold-r9,
                                             threshX-LowQ-r9            ReselectionThresholdQ-r9
                                         }                              OPTIONAL    -- Cond RSRQ
    ]]
}

InterFreqNeighCellList ::=           SEQUENCE (SIZE (1..maxCellInter)) OF InterFreqNeighCellInfo InterFreqNeighCellInfo ::=           SEQUENCE {
    physCellId                           PhysCellId,
    q-OffsetCell                         Q-OffsetRange
}

InterFreqBlackCellList ::=           SEQUENCE (SIZE (1..maxCellBlack)) OF PhysCellIdRange

-- ASN1STOP
```

INDICATOR FOR STAND-ALONE CELL OR MACRO-ASSISTED CELL IS PUT HERE

MOBILE STATION, SMALL RADIO BASE STATION, AND COMMUNICATION CONTROL METHOD

TECHNICAL FIELD

The present invention relates to a mobile station, a small radio base station, and a communication control method.

BACKGROUND ART

In June 2012, 3GPP hosted a workshop that involved radio access techniques in the future.

In the workshop, many companies proposed an "enhanced small cell" as one of the radio access techniques in the future (see Non-patent document 1).

Particularly, a "macro-assisted cell (or a phantom cell)" was proposed in addition to the existing "stand-alone cell" (see Non-patent document 2).

The followings are characteristics of a mobile communication system in which the "macro-assisted cell" is located.

The mobile communication system is configured to split C-plane and U-plane between a macro cell and the "macro-assisted cell."

As a result, the macro cell can maintain excellent mobility and connectivity by supporting the C-plane (RRC signaling) at a low frequency used in a conventional mobile communication system.

In the meantime, the "macro-assisted cell" can provide communication with fast throughput as well as flexible and efficient cost and power by performing the communication of the U-plane (user data) while using a high frequency where a broadband is available.

Here, unlike the existing cell, the "macro-assisted cell" is not required to transmit a reference signal common to cells, a synchronization signal, or broadcast information (MIB/SIB). In this regard, the "macro-assisted cell" is a cell with a different concept from that of the conventional cell.

Meanwhile, in the mobile communication system in which the "macro-assisted cell" is located, the C-plane and the U-plane are generally split between the macro cell and the "macro-assisted cell" as described above. Specifically, the macro cell transmits the C-plane while the "macro-assisted cell" transmits the U-plane. Such assignments of the C-plane and the U-plane may be strict or not.

For example, part of the U-plane may be transmitted by the macro cell. To be more precise, since connectivity or stability is important in a "real time service" such as a voice service, the macro cell may transmit such a "real time service" also in consideration of quality during high-speed movement.

On the other hand, concerning the C-plane as well, control information that is important in establishing the communication may be transmitted by the macro cell while other less important control information may be transmitted by the "macro-assisted cell."

In the above-described mobile communication system, a mobile station UE can establish connection to both of the macro cell and the "macro-assisted cell" at the same time.

Note that the "macro-assisted cell" is a cell which can be operated only within the coverage of the macro cell.

PRIOR ART DOCUMENTS

Non-Patent Documents

Non-patent document 1: RWS-120045, http://3gpp.org/Future-Radio-in-3GPP-300-attend (searched on Jul. 25, 2012)

Non-patent document 2: RWS-120010, http://3gpp.org/Future-Radio-in-3GPP-300-attend (searched on Jul. 25, 2012)

SUMMARY OF THE INVENTION

As described above, in order to operate the "macro-assisted cell," there is a restriction that the "macro-assisted cell" has to be located within the coverage of the macro cell.

However, some areas or certain places, such as regions in the back of indoor or underground places, may often be out of the coverage of the macro cell.

In such areas or places, it is preferable that the "macro-assisted cell" be operated as the "stand-alone cell" as in the conventional example.

Meanwhile, from the perspective of "manufacturing" or of the standard specifications, it is desirable that the "macro-assisted cell" and the "stand-alone cell" have a mutual radio interface as much as possible.

In the meantime, it is desirable that the "macro-assisted cell" remain capable of being operated as the "stand-alone cell" if the macro cell stops a radio communication service for some reason (such as a failure).

The present invention has been made in view of the aforementioned problems. An objective of the present invention is to provide a mobile station, a small radio base station, and a communication control method, which are capable of realizing a "macro-assisted cell" adaptable to multiple operation modes.

A first feature of the present invention is summarized as a mobile station used in a mobile communication system provided with a macro cell and a small cell, where the small cell is any of a first cell capable of being operated independently of the macro cell and a second cell incapable of being operated independently of the macro cell, the mobile station including: a reception unit configured to detect a prescribed signal transmitted by the small cell; and a control unit configured to determine whether a sequence in the prescribed signal is a sequence for the first cell or a sequence for the second cell. Here, when the sequence in the prescribed signal is determined as the sequence for the first cell, the control unit is configured to start communication in the small cell on the basis of broadcast information of the small cell, and when the sequence in the prescribed signal is determined as the sequence for the second cell, the control unit is configured to start the communication in the small cell on the basis of a control signal from the macro cell.

A second feature of the present invention is summarized as a mobile station used in a mobile communication system provided with a macro cell and a small cell, where the small cell is any of a first cell capable of being operated independently of the macro cell and a second cell incapable of being operated independently of the macro cell, the mobile station including: a reception unit configured to detect a synchronization signal transmitted by the small cell; and a control unit configured to determine whether a sequence in the synchronization signal is a sequence for the first cell or a sequence for the second cell. Here, when the sequence in the synchronization signal is determined as the sequence for the first cell, the control unit is configured to start communication in the small cell on the basis of broadcast information of the small cell, and when the sequence in the synchronization signal is determined as the sequence for the second cell, the control unit is configured to start the communication in the small cell on the basis of a control signal from the macro cell.

A third feature of the present invention is summarized as a mobile station used in a mobile communication system provided with a macro cell and a small cell, where the small cell is any of a first cell capable of being operated independently of the macro cell and a second cell incapable of being operated independently of the macro cell, the mobile station including: a reception unit configured to detect a synchronization signal transmitted by the small cell, and then to receive a prescribed signal transmitted by using a subframe which is the same as or located at the periphery of a subframe of the synchronization signal; and a control unit configured to determine whether the small cell is the first cell or the second cell on the basis of a content of notification by the prescribed signal. Here, when the small cell is determined as the first cell, the control unit is configured to start communication in the small cell on the basis of broadcast information of the small cell, and when the small cell is determined as the second cell, the control unit is configured to start the communication in the small cell on the basis of a control signal from the macro cell.

A fourth feature of the present invention is summarized as a mobile station used in a mobile communication system provided with a macro cell and a small cell, where the small cell is any of a first cell capable of being operated independently of the macro cell and a second cell incapable of being operated independently of the macro cell, the mobile station including: a reception unit configured to detect a synchronization signal transmitted by the small cell, and then to receive a prescribed signal; and a control unit configured to determine whether a sequence in the prescribed signal is a sequence for the first cell or a sequence for the second cell. Here, when the sequence in the prescribed signal is determined as the sequence for the first cell, the control unit is configured to start communication in the small cell on the basis of broadcast information of the small cell, and when the sequence in the prescribed signal is determined as the sequence for the second cell, the control unit is configured to start the communication in the small cell on the basis of a control signal from the macro cell.

A fifth feature of the present invention is summarized as a mobile station used in a mobile communication system provided with a macro cell and a small cell, where the small cell is any of a first cell capable of being operated independently of the macro cell and a second cell incapable of being operated independently of the macro cell, the mobile station including: a reception unit configured to receive broadcast information transmitted by the small cell; and a control unit configured to determine whether the small cell is the first cell or the second cell on the basis of a content of notification by the broadcast information. Here, when the small cell is determined as the first cell, the control unit is configured to start communication in the small cell on the basis of the rest of the broadcast information of the small cell, and when the small cell is determined as the second cell, the control unit is configured to start the communication in the small cell on the basis of a control signal from the macro cell.

A sixth feature of the present invention is summarized as a mobile station used in a mobile communication system provided with a macro cell and a small cell, where the small cell is any of a first cell capable of being operated independently of the macro cell and a second cell incapable of being operated independently of the macro cell, the mobile station including: a control unit configured to determine whether or not specific broadcast information of the macro cell notifies that a carrier for cell reselection is a carrier on which only the first cell is present. Here, when the control unit determines that the specific broadcast information notifies that the carrier for the cell reselection is the carrier on which only the first cell is present, the control unit is configured to perform the cell reselection of the cell on the carrier, and then to start communication in the cell on the basis of broadcast information of the cell, and when the control unit determines that the specific broadcast information does not notify that the carrier for the cell reselection is the carrier on which only the first cell is present, the control unit is configured to start the communication with the cell on the carrier on the basis of a control signal from the macro cell.

A seventh feature of the present invention is summarized as a small radio base station configured to manage a small cell, where the small cell is any of a first cell capable of being operated independently of a macro cell under control of a macro radio base station and a second cell incapable of being operated independently of the macro cell, the small radio base station including: a transmission unit configured to transmit a prescribed signal. Here, the transmission unit is configured to use a sequence for the first cell as a sequence in the prescribed signal when the small cell is operated as the first cell, and to use a sequence for the second cell as the sequence in the prescribed signal when the small cell is operated as the second cell.

A eighth feature of the present invention is summarized as a communication control method for a mobile station usable in a mobile communication system provided with a macro cell and a small cell, where the small cell is any of a first cell capable of being operated independently of the macro cell and a second cell incapable of being operated independently of the macro cell, the method including: a first step of detecting a prescribed signal transmitted by the small cell; a second step of determining whether a sequence in the prescribed signal is a sequence for the first cell or a sequence for the second cell; and a third step of starting communication in the small cell. Here, when the sequence in the prescribed signal is determined as the sequence for the first cell in the second step, the communication in the small cell is started in the third step on the basis of broadcast information of the small cell, and when the sequence in the prescribed signal is determined as the sequence for the second cell in the second step, the communication in the small cell is started in the third step on the basis of a control signal from the macro cell.

A ninth feature of the present invention is summarized as a small radio base station configured to manage a small cell, where the small cell is any of a first cell capable of being operated independently of a macro cell under control of a macro radio base station and a second cell incapable of being operated independently of the macro cell, wherein the small radio base station switches the small cell so as to be operated as any one of the first cell and the second cell depending on an operation status of the macro cell.

BRIEF DESCRIPTION OF THE DRAWINGS

FIG. 5 is a functional block diagram of a macro radio base station and a mobile station according to the first embodiment of the present invention.

FIG. 9 is a view showing an example of a new signal to be transmitted by a small radio base station according to a second modified example of the present invention.

FIG. 10 is a flowchart showing an operation of a mobile station according to the second modified example of the present invention.

FIG. 11 is a flowchart showing an operation of a mobile station according to a third modified example of the present invention.

FIG. 15 is a view showing an example of broadcast information to be transmitted by a small radio base station according to a fifth modified example of the present invention.

MODES FOR CARRYING OUT THE INVENTION (Mobile Communication System According to First Embodiment of Present Invention)

A mobile communication system according to a first embodiment of the present invention will be described with reference to FIG. 1 to FIG. 6.

An LTE mobile communication system is described as an example in this embodiment. However, the present invention is not limited only to such a mobile communication system, but are also applicable to mobile communication systems of other schemes.

Figure 1:
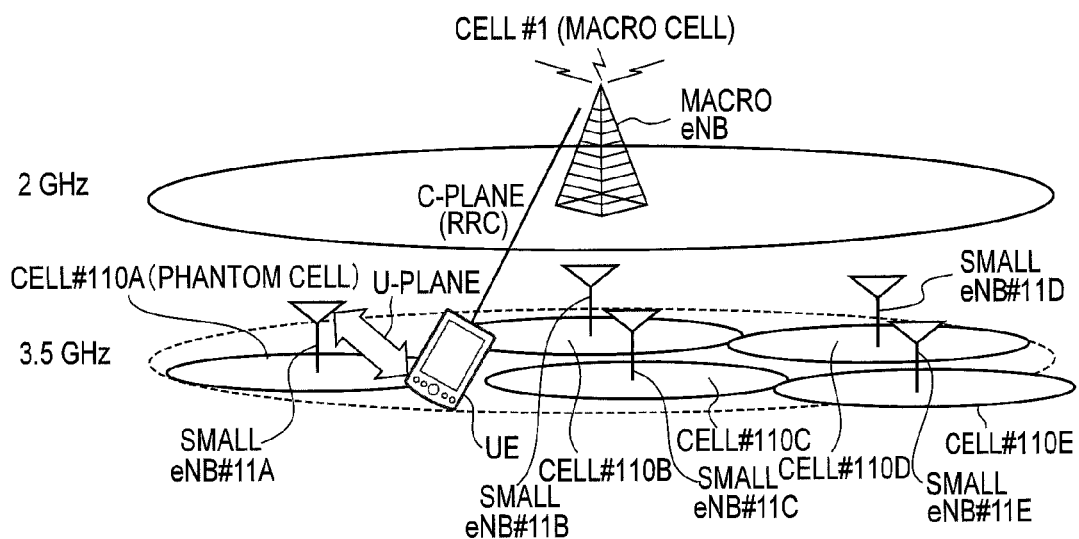
FIG. 1 is an overall configuration diagram of a mobile communication system according to a first embodiment of the present invention.

As shown in FIG. 1, a cell #1 being a "macro cell" as well as a cell #110A, a cell #110B, a cell #110C, a cell #110D, a cell #110E, and so forth each being a "small cell," are located in the mobile communication of this embodiment.

Here, in the macro cell, a macro radio base station Macro eNB provides mobile communication services. Meanwhile, in each small cell, a small radio base station Small eNB #11 (Small eNB #11A, Small eNB #11B, Small eNB #11C, Small eNB #11D or Small eNB #11E in the example of FIG. 1) provides mobile communication services. Specifically, the small radio base stations Small eNB #11A, Small eNB #11B, Small eNB #11C, Small eNB #11D, and Small eNB #11E provide the mobile communication services in the cell #110A, the cell #110B, the cell #110C, the cell #110D, and the cell #110E, respectively.

In the example of FIG. 1, the cell #1 is operated in the 2 GHz band while the cell #110A, the cell #110B, and the cell #110C are operated in the 3.5 GHz band.

Note that the frequency bands such as the 2 GHz band and the 3.5 GHz band are mere examples. A frequency band other than the 2 GHz band may be used by the cell #1 while a frequency band other than the 3.5 GHz band may be used by the cell #110A, the cell #110B, the cell #110C, the cell #110D, and/or the cell #110E.

For example, the cell #110A may be a "macro-assisted cell (a phantom cell)" while the cell #110B may be a "stand-alone cell."

When the cell #110A is the "macro-assisted cell," a mobile station UE is configured to establish connection to both of the macro radio base station Macro eNB and the small radio base station Small eNB #11A, to perform transmission and reception of C-plane to and from the macro radio base station Macro eNB, and to perform transmission and reception of U-plane to and from the small radio base station Small eNB #11A.

To be more precise, the connection between the mobile station UE and the small radio base station Small eNB #11A is established on the basis of a control signal (the C-plane) exchanged between the mobile station UE and the macro radio base station Macro eNB, and the mobile station UE exchanges user data (the U-plane) with the small radio base station Small eNB #11A by using the connection between the mobile station UE and the small radio base station Small eNB #11A thus established.

Figure 2:
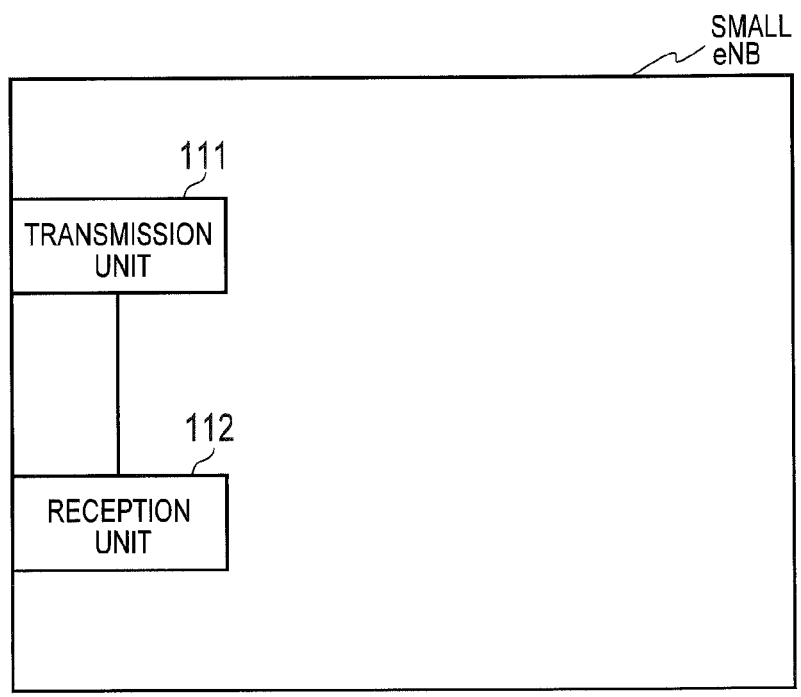
FIG. 2 is a functional block diagram of a small radio base station according to the first embodiment of the present invention.

As shown in FIG. 2, each small radio base station Small eNB includes a transmission unit 111 and a reception unit 112. The small radio base stations Small eNB #11A, Small eNB #11B, Small eNB #11C, Small eNB #11D, and Small eNB #11E have the same configuration, functions, and conditions. Accordingly, in the following descriptions, these small radio base stations will be collectively referred to as the small radio base station Small eNB unless otherwise stated. It is to be also noted that the cell under control of the small radio base station Small eNB will be called the cell #110.

The transmission unit 111 is configured to transmit various signals to the mobile station UE in the cell #110 under control of the small radio base station Small eNB. The reception unit 112 is configured to receive various signals from the mobile station UE in the cell #110 under control of the small radio base station Small eNB.

For example, the transmission unit 111 is configured to transmit a PSS (primary synchronization signal) and an SSS (secondary synchronization signal) in the cell #110 under control of the small radio base station Small eNB.

Each cell has 504 PCIs (physical cell IDs). In the meantime, each of the PSS and the SSS has a sequence of 504 pieces, so that the mobile station UE can specify a PCI by specifying a sequence in any of the PSS and the SSS.

Figure 3:
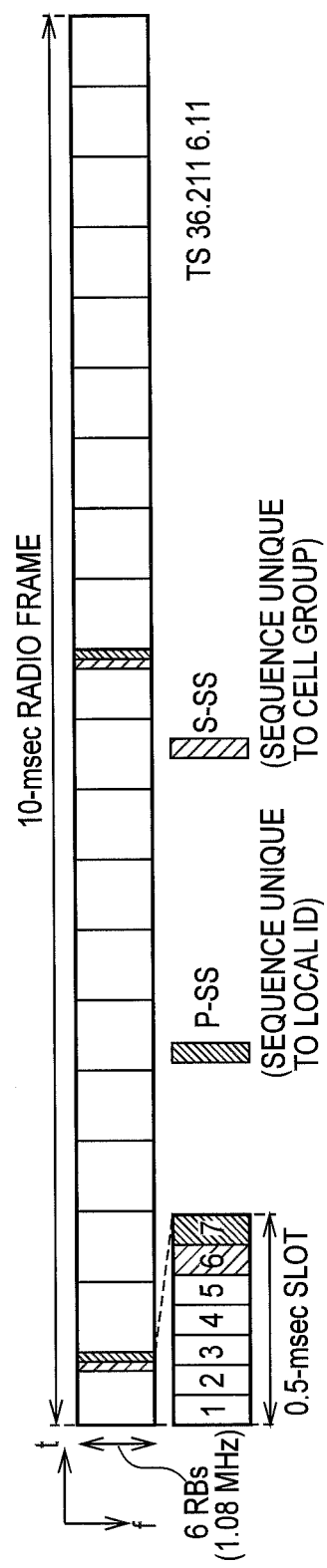
FIG. 3 is a view showing examples of synchronization signals to be transmitted by the small radio base station according to the first embodiment of the present invention.

As shown in FIG. 3, the PSS and the SSS are defined to be located at the end of first slots of subframes 0 and 5 in a radio frame, respectively.

The PSS and the SSS are defined to be located at a cycle of 5 ms in consideration of an overhead, a time diversity effect, LTE cell selection and cell reselection as well as a measurement by a different system, and so forth.

Figure 4:
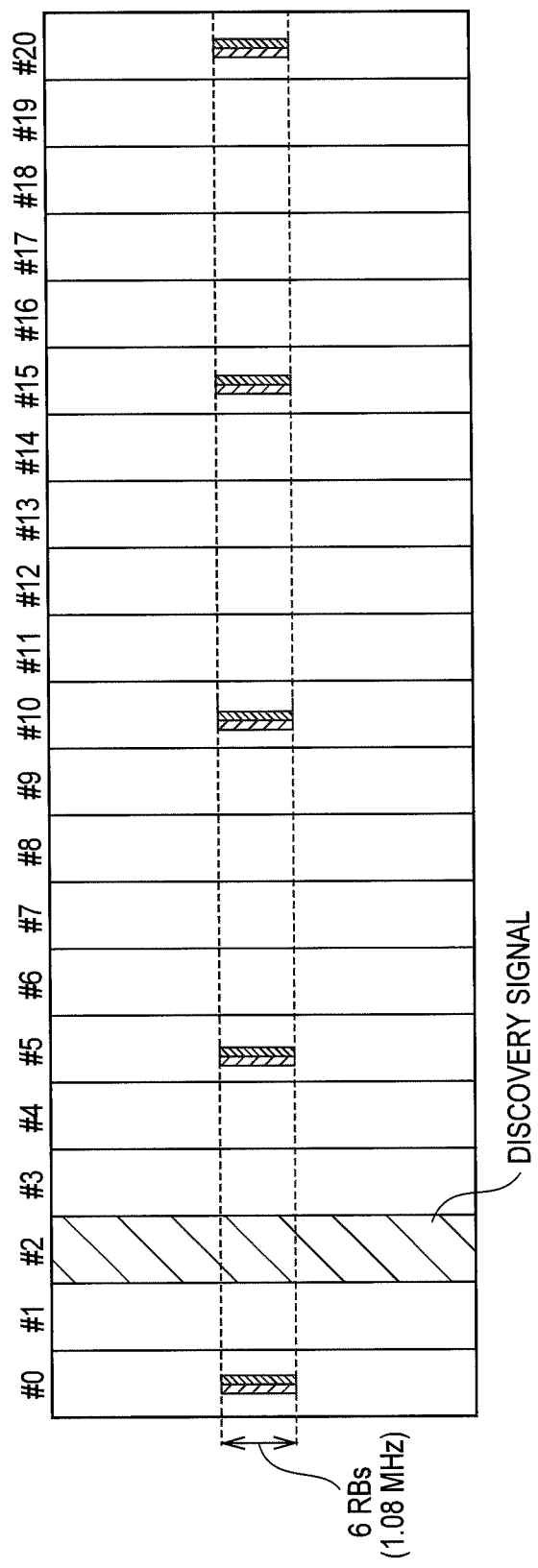
FIG. 4 is a view showing an example of a "discovery signal" to be transmitted by the small radio base station according to the first embodiment of the present invention.

Meanwhile, as shown in FIG. 4, the transmission unit 111 is configured to transmit a "discovery signal", which is a newly defined signal, in addition to the PSS and the SSS.

Here, part of a sequence in the "discovery signal" will be defined as a sequence for the "stand-alone cell" while the rest of the sequence in the "discovery signal" will be defined as a sequence for the "macro-assisted cell."

For example, a sequence in the "discovery signal" having IDs from "0" to "503" may be defined as the sequence for the "stand-alone cell" while a sequence in the "discovery signal" having IDs from "504" to "1007" may be defined as the sequence for the "macro-assisted cell."

Here, by defining the position of the "discovery signal" in the form of specifications such as "SFN (system frame number) #N1, subframe number #N2, and resource block numbers #N3 and #N4," the mobile station LIE can detect positions of the PSS and the SSS just by detecting the "discovery signal."

In the description made above, the "#N1" is the number that specifies the system frame number, the "#N2" is the number that specifies the subframe number, and the "#N3" and "#N4" are the numbers that specify the resource block numbers.

Meanwhile, in addition to the determination as to whether or not a certain cell is the "macro-assisted cell" depending on the sequence in the "discovery signal," the determination as to whether or not the certain cell is the "macro-assisted cell" may be made depending on a resource position (in terms of time or the frequency) of the "discovery signal."

As shown in FIG. 5(a), the mobile station UE includes a reception unit 21, a control unit 22, and a transmission unit 23.

The reception unit 21 is configured to receive various signals from the macro radio base station Macro eNB that manages the cell #1 and from the small radio base station Small eNB that manages the cell #110. The transmission unit 23 is configured to transmit various signals to the macro radio base station Macro eNB that manages the cell #1 and to the small radio base station Small eNB that manages the cell #110.

Here, concerning the small cell, i.e., in the 3.5 GHz band, the reception unit 21 is configured to detect the above-described "discovery signal" in addition to the PSS and the SSS.

The control unit 22 is configured to determine whether a sequence in the "discovery signal" is a sequence for the "stand-alone cell" or a sequence for the "macro-assisted cell."

Here, when the sequence in the "discovery signal" is determined as the sequence for the "stand-alone cell," the control unit 22 is configured to start communication in the small cell on the basis of the MIB/SIB of the small cell. In other words, the control unit 22 is configured to establish connection (the U-plane and the C-plane) in the "stand-alone cell."

On the other hand, when the sequence in the "discovery signal" is determined as the sequence for the "macro-assisted cell," the control unit 22 is configured to start the communication in the small cell on the basis of the control signal from the macro cell. In other words, the control unit 22 is configured to establish the connection in the small cell on the basis of the control signal (the C-plane) exchanged between the macro radio base station Macro eNB and the mobile station UE.

In this case, the reception unit 21 is configured not to receive the broadcast information of the small cell (the "macro-assisted cell").

Meanwhile, the reception unit 21 is configured to acquire control signals (which correspond to the MIB/SIB) for the above-described small cell (the "macro-assisted cell") through an individual control signal and broadcast information from the macro radio base station Macro eNB.

As shown in FIG. 5(b), the macro radio base station Macro eNB includes a transmission unit 31 and a reception unit 32.

The transmission unit 31 is configured to transmit various signals to the mobile station UE in the macro cell under control of the macro radio base station Macro eNB. The reception unit 32 is configured to receive various signals from the mobile station UE in the macro cell under control of the macro radio base station Macro eNB.

Moreover, the transmission unit 31 transmits the control signals (which correspond to the MIB/SIB) for the small cell (the "macro-assisted cell") using the individual control signal and the broadcast information.

Furthermore, when the mobile station UE establishes the connection to the small radio base station Small eNB in the small cell (the "macro-assisted cell"), the transmission unit 31 transmits a control signal, which is for establishing the above-mentioned connection, to the mobile station UE by using individual control signal.

The individual control signal may be notified by use of an RRC layer, or any other layers including a PDCP layer, an RLC layer, a MAC layer, a physical layer, and the like.

An operation of the mobile station UE of this embodiment will be described below with reference to FIG. 6.

Figure 6:
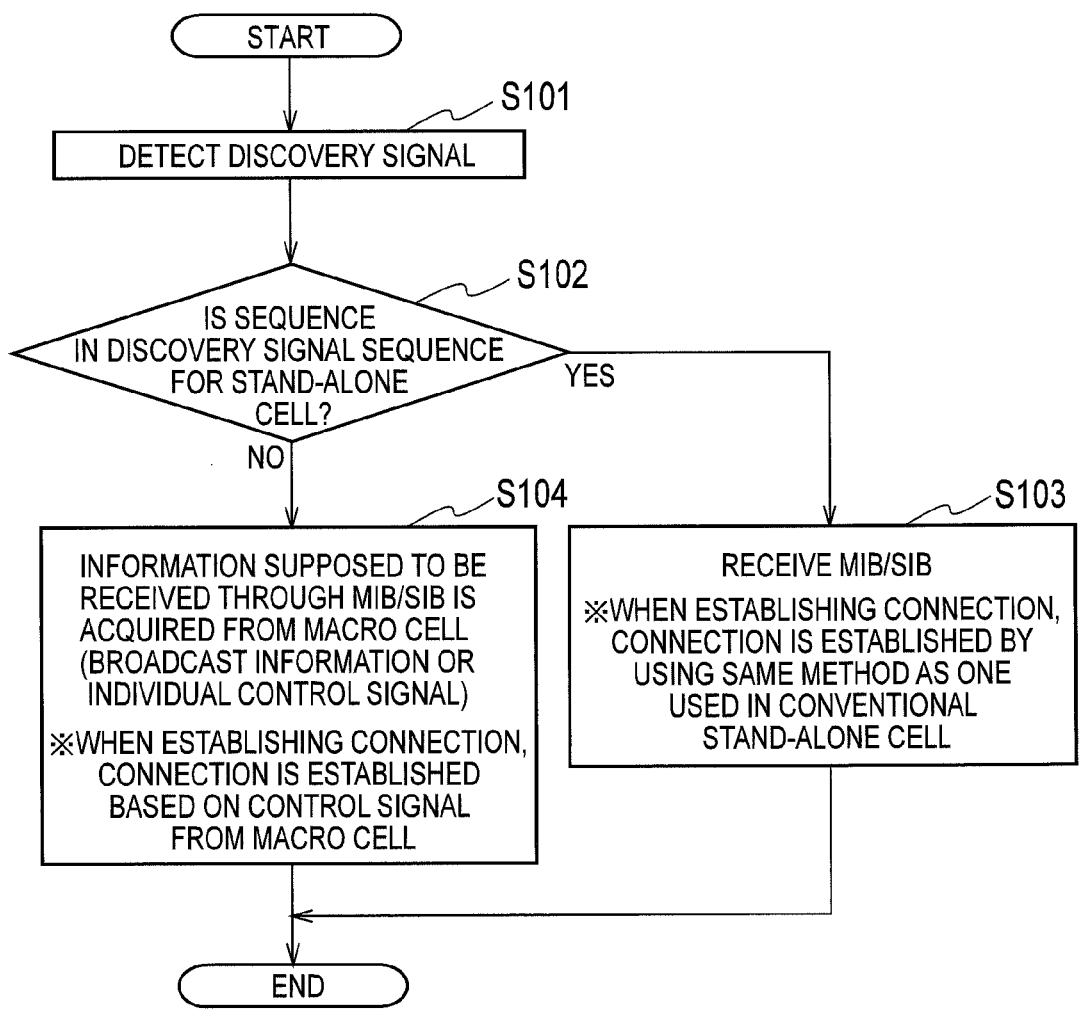
FIG. 6 is a flowchart showing an operation of the mobile station according to the first embodiment of the present invention.

As shown in FIG. 6, when the mobile station UE detects the "discovery signal" in the small cell in step S101, the mobile station UE determines whether the sequence in the "discovery signal" is the sequence for the "stand-alone cell" or the sequence for the "macro-assisted cell" in step S102.

When the sequence in the "discovery signal" is determined as the sequence for the "stand-alone cell," the mobile station UE receives the MIB and the SIB of the small cell in step S103.

In this case, if the mobile station UE establishes the connection to the small cell, the mobile station UE establishes the connection by the same method as the one used in the case of an ordinary (conventional) "stand-alone cell."

On the other hand, when the sequence in the "discovery signal" is determined as the sequence for the "macro-assisted cell," the mobile station UE receives the control signals corresponding to the MIB and the SIB of the small cell in step S104 through the individual control signal, the broadcast information, and the like from the macro radio base station Macro eNB.

In this case, if the mobile station UE establishes the connection to the small cell, the mobile station UE establishes the connection on the basis of the individual control signal from the macro radio base station Macro eNB.

The individual control signal may be notified by use of the RRC layer, or any other layers including the PDCP layer, the RLC layer, the MAC layer, the physical layer, and the like.

According to the mobile communication system of this embodiment, the mobile station UE can determine whether the small cell is the "stand-alone cell" or the "macro-assisted cell" on the basis of the detected sequence in the "discovery signal."

As a consequence, a particular small cell can be operated both as the "stand-alone cell" and as the "macro-assisted cell" by changing the sequence in the "discovery signal" transmitted in the small cell.

(First Modified Example)

A mobile communication system according to a first modified example of the present invention will be described with reference to FIG. 7 and FIG. 8, while focusing on differences from the above-described mobile communication system according to the first embodiment.

In the mobile communication system according to the first modified example, part of a sequence in the PSS/SSS is defined as the sequence for the "stand-alone cell" while the rest of the sequence is defined as the sequence for the "macro-assisted cell."

For example, a sequence in the PSS/SSS having IDs from "0" to "99" may be defined as the sequence for the "stand-alone cell" while a sequence in the PSS/SSS having IDs from "100" to "503" may be defined as the sequence for the "macro-assisted cell."

Figure 7:
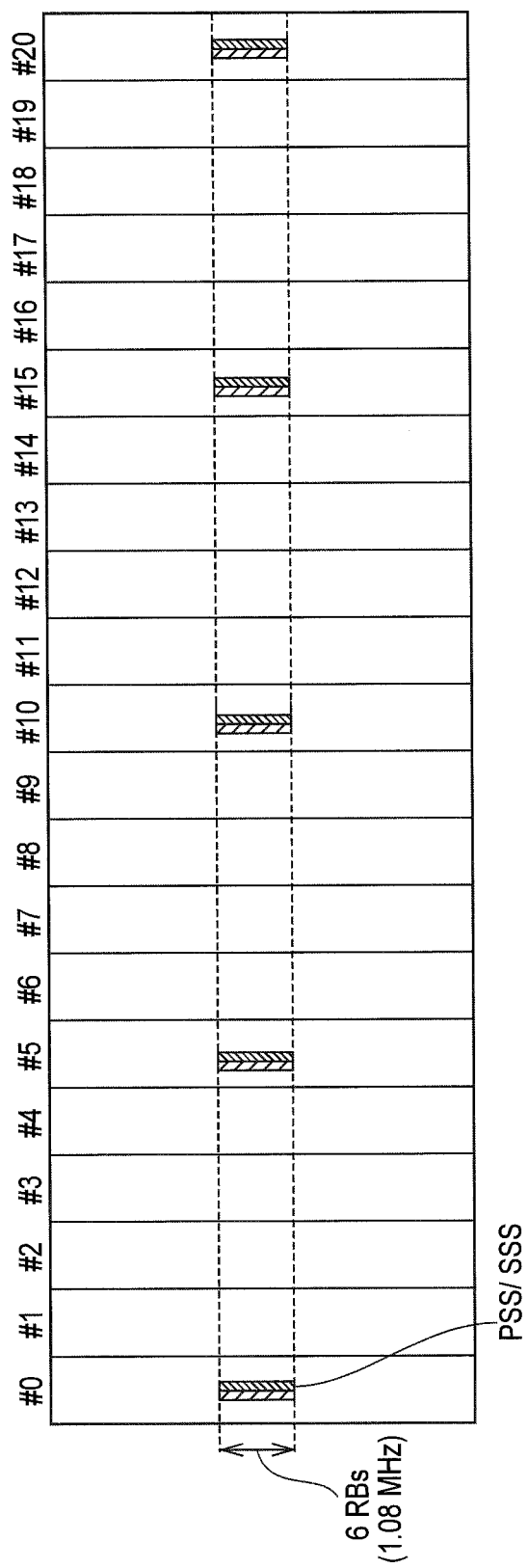
FIG. 7 is a view showing examples of synchronization signals to be transmitted by a small radio base station according to a first modified example of the present invention.

Meanwhile, the transmission unit 111 in the small radio base station Small eNB is configured to transmit the PSS and the SSS as shown in FIG. 7.

The control unit 22 in the mobile station UE is configured to determine whether a certain sequence in the PSS/SSS in the small cell is a sequence for the "stand-alone cell" or a sequence for the "macro-assisted cell."

Here, when the sequence in the PSS/SSS in the small cell is determined as the sequence for the "stand-alone cell," the control unit 22 is configured to start the communication in the small cell on the basis of the MIB/SIB of the small cell. In other words, the control unit 22 is configured to establish the connection (the U-plane and the C-plane) in the "stand-alone cell."

On the other hand, when the sequence in the PSS/SSS in the small cell is determined as the sequence for the "macro-assisted cell," the control unit 22 is configured to start the communication in the small cell on the basis of the control signal from the macro cell. In other words, the control unit 22 is configured to establish the connection in the small cell on the basis of the control signal (the C-plane) exchanged between the macro radio base station Macro eNB and the mobile station UE.

An operation of the mobile station UE of the first modified example will be described below with reference to FIG. 8.

Figure 8:
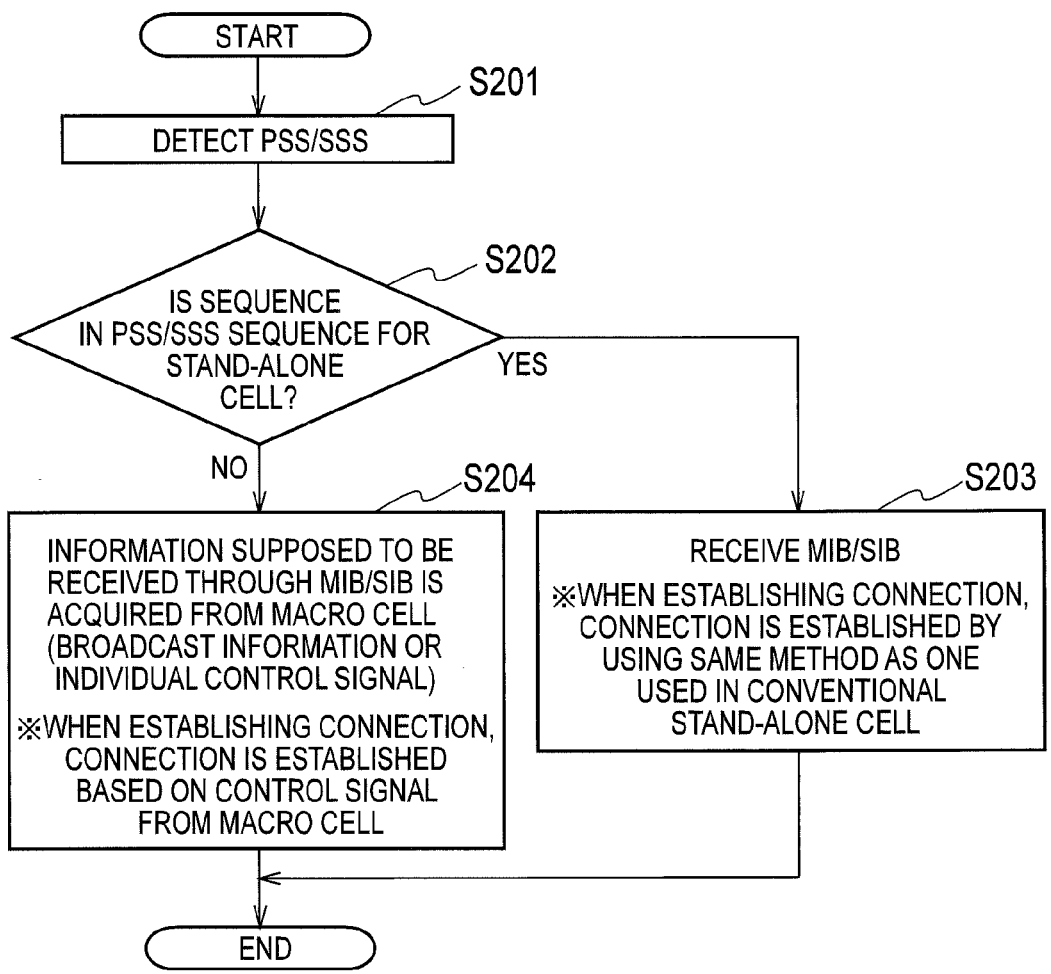
FIG. 8 is a flowchart showing an operation of a mobile station according to the first modified example of the present invention.

As shown in FIG. 8, when the mobile station UE detects the PSS/SSS in the small cell in step S201, the mobile station UE determines whether the sequence in the PSS/SSS is the sequence for the "stand-alone cell" or the sequence for the "macro-assisted cell" in step S202.

When the sequence in the PSS/SSS is determined as the sequence for the "stand-alone cell," the mobile station UE receives the MIB and the SIB of the small cell in step S203.

In this case, if the mobile station UE establishes the connection to the small cell, the mobile station UE establishes the connection by the same method as the one used in the case of the ordinary (conventional) "stand-alone cell."

On the other hand, when the sequence in the PSS/SSS is determined as the sequence for the "macro-assisted cell," the mobile station UE receives the control signals corresponding to the MIB and the SIB of the small cell in step S204 through the individual control signal, the broadcast information, and the like from the macro radio base station Macro eNB.

In this case, if the mobile station UE establishes the connection to the small cell, the mobile station UE establishes the connection on the basis of the individual control signal from the macro radio base station Macro eNB.

According to the mobile communication system of the first modified example, the mobile station UE can determine whether the small cell is the "stand-alone cell" or the "macro-assisted cell" on the basis of the detected sequence in the PSS/SSS.

As a consequence, a particular small cell can be operated both as the "stand-alone cell" and as the "macro-assisted cell" by changing the sequence in the PSS/SSS transmitted in the small cell.

(Second Modified Example)

A mobile communication system according to a second modified example of the present invention will be described with reference to FIG. 9 and FIG. 10, while focusing on differences from the above-described mobile communication system according to the first embodiment.

As shown in FIG. 9, in the mobile communication system according to the second modified example, the transmission unit 111 in the small radio base station Small eNB is configured to transmit a new signal by using a subframe which is either the same as or located at the periphery of a subframe of the PSS/SSS.

Here, the new signal is a signal which notifies whether the cell transmitting the new signal is the "stand-alone cell" or the "macro-assisted cell."

The new signal may be a signal which uses one bit just for identifying the "stand-alone cell" or the "macro-assisted cell" or may be a signal corresponding to the above-described "discovery signal."

After the detection of the PSS/SSS transmitted in the small cell, the reception unit 21 in the mobile station UE is configured to receive the new signal transmitted by using the subframe which is the same as or located at the periphery of the subframe of the PSS/SSS.

The control unit 22 in the mobile station UE is configured to determine whether the small cell is the "stand-alone cell" or the "macro-assisted cell" on the basis of the content of notification by the new signal.

Alternatively, the control unit 22 in the mobile station UE may be configured to determine whether the small cell is the "stand-alone cell" or the "macro-assisted cell" depending on a resource position (in terms of time or the frequency) of the above-described new signal.

Here, when the small cell is determined as the "stand-alone cell," the control unit 22 is configured to start the communication in the small cell on the basis of the MIB/SIB of the small cell. In other words, the control unit 22 is configured to establish the connection (the U-plane and the C-plane) in the "stand-alone cell."

On the other hand, when the small cell is determined as the "macro-assisted cell," the control unit 22 is configured to start the communication in the small cell on the basis of the control signal from the macro cell. In other words, the control unit 22 is configured to establish the connection in the small cell on the basis of control signal (the C-plane) exchanged between the macro radio base station Macro eNB and the mobile station UE.

The individual control signal may be notified by use of the RRC layer, or any other layers including the PDCP layer, the RLC layer, the MAC layer, the physical layer, and the like.

Meanwhile, when the new signal is the signal corresponding the above-described "discovery signal," the control unit 22 may be configured to detect an ID (such as a phantom cell ID) of the small cell.

In the meantime, the new signal need not be the signal used for detecting the cell, such as the "discovery signal" of the first embodiment and the PSS/SSS described above.

An operation of the mobile station UE of the second modified example will be described below with reference to FIG. 10.

As shown in FIG. 10, when the mobile station UE detects the PSS/SSS in the small cell in step S301, the mobile station UE receives the new signal and determines whether the small cell is the "stand-alone cell" or the "macro-assisted cell" in step S302 on the basis of the content of notification by the new signal.

When the small cell is determined as the "stand-alone cell," the mobile station UE receives the MIB and the SIB of the small cell in step S303.

In this case, if the mobile station UE establishes the connection to the small cell, the mobile station UE establishes the connection by the same method as the one used in the case of the ordinary (conventional) "stand-alone cell."

On the other hand, when the small cell is determined as the "macro-assisted cell," the mobile station UE receives the control signals corresponding to the MIB and the SIB of the small cell in step S304 through the individual control signal, the broadcast information, and the like from the macro radio base station Macro eNB.

In this case, if the mobile station UE establishes the connection to the small cell, the mobile station UE establishes the connection on the basis of the individual control signal from the macro radio base station Macro eNB.

According to the mobile communication system of the second modified example, the mobile station UE can determine whether the small cell is the "stand-alone cell" or the "macro-assisted cell" on the basis of the received new signal.

As a consequence, a particular small cell can be operated both as the "stand-alone cell" and as the "macro-assisted cell" by changing the content of notification by the new signal transmitted in the small cell.

(Third Modified Example)

A mobile communication system according to a third modified example of the present invention will be described with reference to FIG. 11, while focusing on differences from the above-described mobile communication system according to the first embodiment.

In the mobile communication system according to the third modified example, the reception unit 21 in the mobile station UE is configured to receive the "discovery signal" after the detection of the PSS/SSS transmitted in the small cell.

Here, the reception unit 21 is configured to detect the cell by using the PSS/SSS instead of detecting the cell by using the "discovery signal."

An operation of the mobile station UE of the third modified example will be described below with reference to FIG. 11.

As shown in FIG. 11, in step S401, the mobile station UE receives the "discovery signal" after detecting the PSS/SSS in the small cell. In step S402, the mobile station UE determines whether the sequence in the "discovery signal" is the sequence for the "stand-alone cell" or the sequence for the "macro-assisted cell."

When the sequence in the "discovery signal" is determined as the sequence for the "stand-alone cell," the mobile station UE receives the MIB and the SIB of the small cell in step S403.

In this case, if the mobile station UE establishes the connection to the small cell, the mobile station UE establishes the connection by the same method as the one used in the case of the ordinary (conventional) "stand-alone cell."

On the other hand, when the sequence in the "discovery signal" is determined as the sequence for the "macro-assisted cell," the mobile station UE receives the control signals corresponding to the MIB and the SIB of the small cell in step S404 through the individual control signal, the broadcast information, and the like from the macro radio base station Macro eNB.

In this case, if the mobile station UE establishes the connection to the small cell, the mobile station UE establishes the connection on the basis of the individual control signal from the macro radio base station Macro eNB.

According to the mobile communication system of the third modified example, the mobile station UE can determine whether the small cell is the "stand-alone cell" or the "macro-assisted cell" on the basis of the detected sequence in the "discovery signal."

As a consequence, a particular small cell can be operated both as the "stand-alone cell" and as the "macro-assisted cell" by changing the sequence in the "discovery signal" transmitted in the small cell.

(Fourth Modified Example)

A mobile communication system according to a fourth modified example of the present invention will be described with reference to FIG. 12 to FIG. 14, while focusing on differences from the above-described mobile communication system according to the first embodiment.

Figure 12:
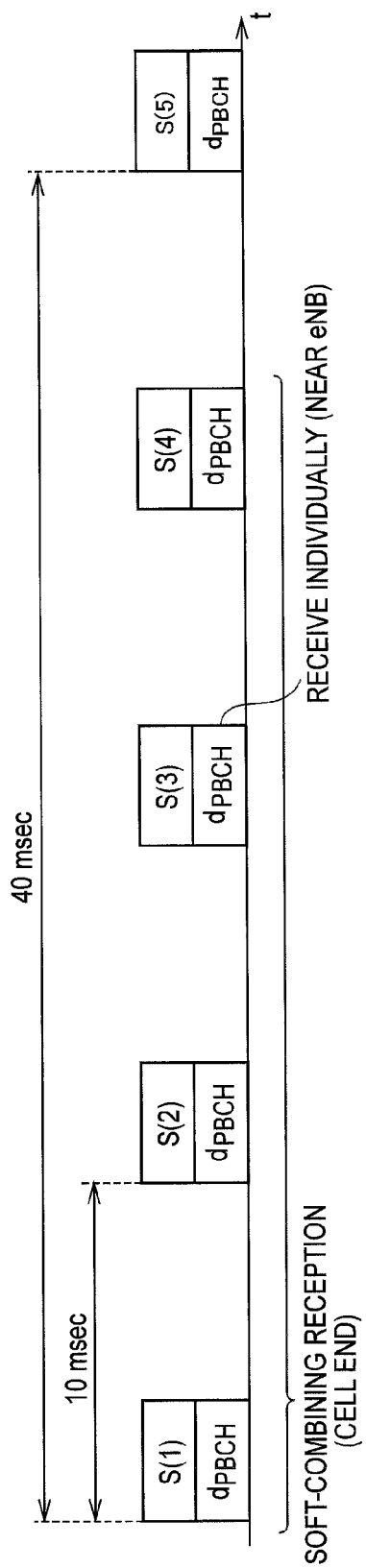
FIG. 12 is a view showing an example of broadcast information to be transmitted by a small radio base station according to a fourth modified example of the present invention.
Figure 13:
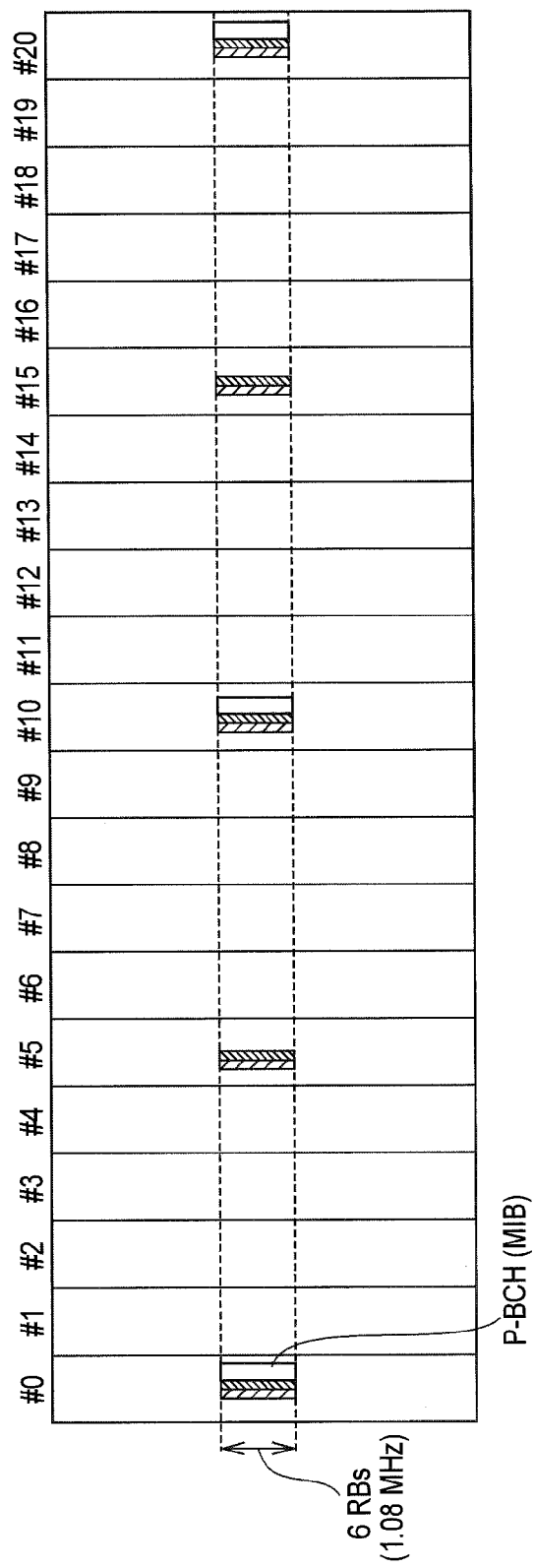
FIG. 13 is a view showing the example of the broadcast information to be transmitted by the small radio base station according to the fourth modified example of the present invention.

In the mobile communication system according to the fourth modified example, the transmission unit 111 in the small radio base station Small eNB is configured to transmit the MIB through a P-BCH (physical-broadcast channel) as shown in FIG. 12 and FIG. 13.

The MIB may include an identifier for notifying whether the cell transmitting the MIB is the "stand-alone cell" or the "macro-assisted cell."

The control unit 22 is configured to determine whether the small cell is the "stand-alone cell" or the "macro-assisted cell" on the basis of the content of notification by the MIB.

Here, when the small cell is determined as the "stand-alone cell," the control unit 22 is configured to start the communication in the small cell on the basis of the SIB of the small cell. In other words, the control unit 22 is configured to establish the connection (the U-plane and the C-plane) in the "stand-alone cell."

On the other hand, when the small cell is determined as the "macro-assisted cell," the control unit 22 is configured to start the communication in the small cell on the basis of the control signal from the macro cell. In other words, the control unit 22 is configured to establish the connection in the small cell on the basis of the control (the C-plane) exchanged between the macro radio base station Macro eNB and the mobile station UE.

An operation of the mobile station LIE of the fourth modified example will be described below with reference to FIG. 14.

Figure 14:
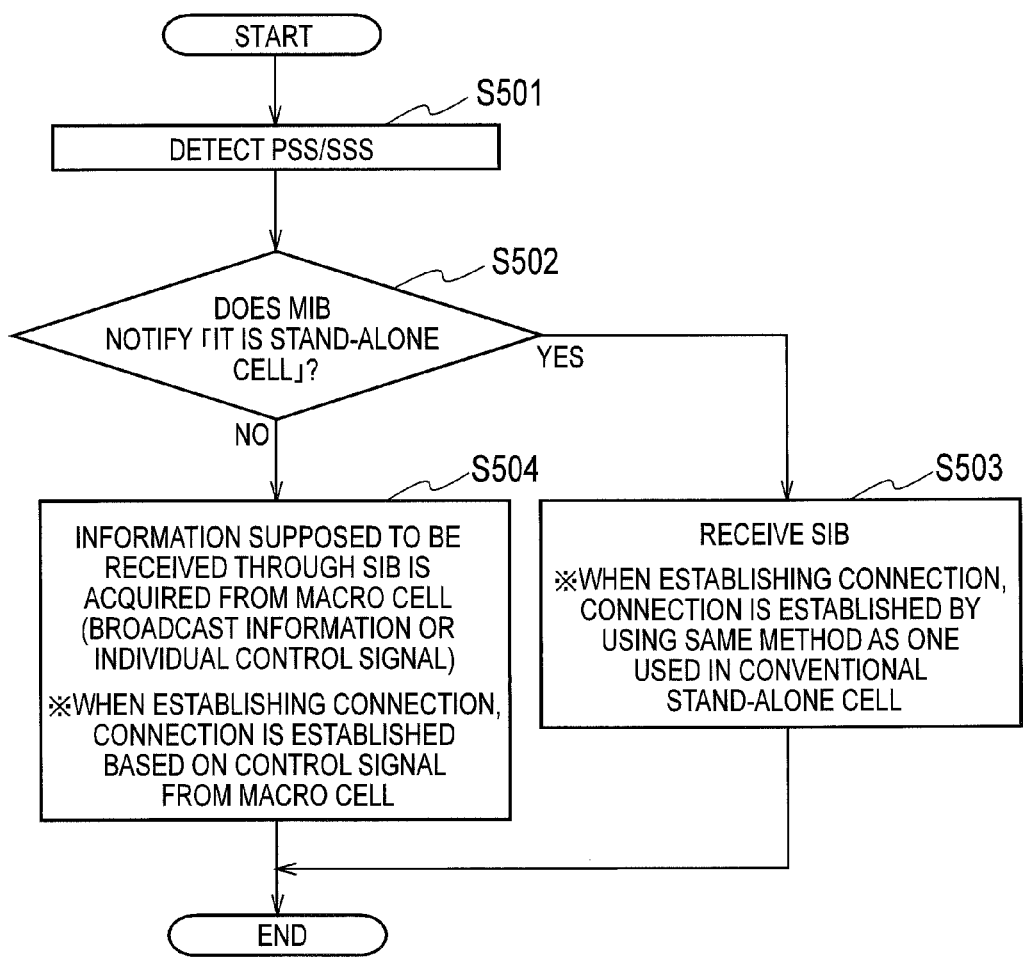
FIG. 14 is a flowchart showing an operation of a mobile station according to the fourth modified example of the present invention.

As shown in FIG. 14, in step S501, the mobile station UE receives the MIB after detecting the PSS/SSS in the small cell. In step S502, the mobile station UE determines whether the small cell is the "stand-alone cell" or the "macro-assisted cell" on the basis of the content of notification by the MIB (the identifier included in the MIB).

When the small cell is determined as the "stand-alone cell," the mobile station UE receives the SIB of the small cell in step S503.

In this case, if the mobile station UE establishes the connection to the small cell, the mobile station UE establishes the connection by the same method as the one used in the case of the ordinary (conventional) "stand-alone cell."

On the other hand, when the small cell is determined as the "macro-assisted cell," the mobile station UE receives the control signal corresponding to the SIB of the small cell in step S504 through the individual control signal, the broadcast information, and the like from the macro radio base station Macro eNB.

In this case, if the mobile station UE establishes the connection to the small cell, the mobile station UE establishes the connection on the basis of the individual control signal from the macro radio base station Macro eNB.

The individual control signal may be notified by use of the RRC layer, or any other layers including the PDCP layer, the RLC layer, the MAC layer, the physical layer, and the like.

According to the mobile communication system of the fourth modified example, the mobile station UE can determine whether the small cell is the "stand-alone cell" or the "macro-assisted cell" on the basis of the MIB received from the small radio base station Small eNB.

As a consequence, a particular small cell can be operated both as the "stand-alone cell" and as the "macro-assisted cell"

by changing the content of notification by (the identifier in) the MIB transmitted in the small cell.

(Fifth Modified Example)

A mobile communication system according to a fifth modified example of the present invention will be described with reference to FIG. 15 and FIG. 16, while focusing on differences from the above-described mobile communication system according to the first embodiment.

In the mobile communication system according to the fifth modified example, as shown in FIG. 15, the transmission unit 31 in the macro radio base station Macro eNB is configured to use SIB5 to transmit an information element for notifying whether a cell as a candidate for cell reselection at a different frequency, which is the cell notified in the SIB5, is the "stand-alone cell" or the "macro-assisted cell."

For example, the information element may notify a fact that only the "macro-assisted cell" is present on a carrier for the cell reselection at the different frequency notified in the SIB5 whereas no "stand-alone cells" are present thereon. In this case, the information element may notify information concerning the "macro-assisted cell" (such as information concerning radio resources of the "discovery signal").

Alternatively, the information element may notify a fact that only the "stand-alone cell or cells" are present on the carrier for the cell reselection at the different frequency notified in the SIB5.

Here, the transmission unit 31 may be configured to transmit any of the information elements by using an individual control signal such as "measurement configuration."

The control unit 22 in the mobile station UE is configured to determine whether or not the SIB5 or the like notifies that the carrier on which the small cell being a target to undergo cell reselection processing (the cell reselection) is located is the carrier on which only the "stand-alone cell or cells" are present.

Here, when the control unit 22 determines that the SIB5 notifies that only the "stand-alone cell or cells" are present on the carrier, the control unit 22 receives the MIB/SIB of the small cell after detecting the PSS/SSS transmitted in the cell.

Meanwhile, when the communication is to be started, the control unit 22 is configured to establish the connection to the small cell by the same method as the one used in the case of the ordinary (conventional) "stand-alone cell," and then to start the communication. In other words, the control unit 22 is configured to establish the connection (the U-plane and the C-plane) in the "stand-alone cell."

On the other hand, when the control unit 22 determines that the SIB5 'does not notify that only the "stand-alone cell or cells" are present on the carrier,' i.e., that the SIB5 'notifies that only the "macro-assisted cell" is present on the carrier,' the control unit 22 is configured to start the communication in the small cell on the basis of the individual control signal from the macro radio base station Macro eNB. In other words, the control unit 22 is configured to establish the connection in the small cell on the basis of the control (the C-plane) exchanged between the macro radio base station Macro eNB and the mobile station UE.

Meanwhile, the control unit 22 is configured to perform the cell reselection processing and measurement processing on the carrier on the basis of the above-described information element notified by way of the SIB5.

Alternatively, the control unit 22 may be configured to determine that the small cell is the "stand-alone cell" if the macro cell is not present.

In the above-described example, the SIB5 notifies the fact that 'only the "macro-assisted cell" is present on the carrier for the cell reselection at the different frequency' or the fact that 'only the "stand-alone cell or cells" are present thereon.' Instead, the SIB5 may notify a fact that "the "macro-assisted cell" as well as the "stand-alone cell or cells" are present on the carrier for the cell reselection at the different frequency."

In this case, the mobile station UE may perform both of the processing to detect the "stand-alone cell" by using the PSS/SSS and the processing to detect the "macro-assisted cell" on the basis of the individual control signal from the macro radio base station Macro eNB.

An operation of the mobile station UE of the fifth modified example will be described below with reference to FIG. 16.

Figure 16:
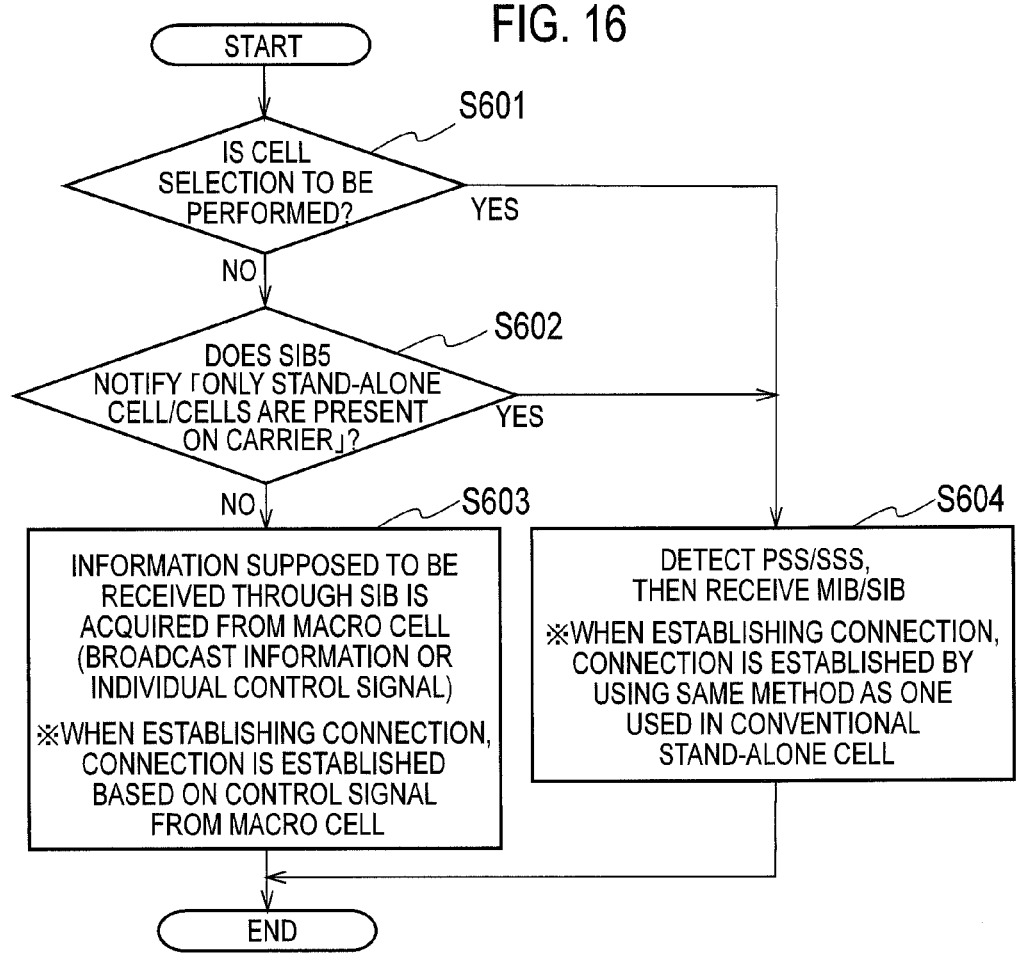
FIG. 16 is a flowchart showing an operation of a mobile station according to the fifth modified example of the present invention.

As shown in FIG. 16, in step S601, the mobile station UE determines whether or not cell selection processing (cell selection) is to be performed.

When the mobile station UE determines that the cell selection processing is to be performed, the mobile station UE detects the small cell by detecting the PSS/SSS, and then receives the MIB/SIB in step S604.

Here, if the mobile station UE establishes the connection to the small cell, the mobile station UE establishes the connection by the same method as the one used in the case of the ordinary (conventional) "stand-alone cell."

Here, the cell selection processing means an operation by the mobile station UE to conduct cell search from scratch without being located in any cell, and hence to detect a particular cell. The cell selection processing takes place, for example, immediately after the mobile station UE is turned on or when the mobile station UE is outside a coverage area of a certain cell.

In the meantime, once the mobile station UE detects an accessible cell, the mobile station UE reads the broadcast information of the cell and enters the coverage area of the cell. Thereafter, the mobile station UE changes the cell in which to be located by performing the cell reselection processing along with a transfer and the like.

Here, in the cell reselection processing, the mobile station UE may perform the cell reselection involving a nearby cell that uses the same frequency or perform the cell reselection involving a nearby cell that uses a different frequency.

Specifically, when the mobile station UE determines in step S601 that "the cell selection processing is not to be performed (the cell reselection processing is to be performed)," the mobile station UE proceeds to step S602.

In the following description, in step S602, the mobile station UE is assumed to be located in the macro cell in the 2 GHz band which is shown in FIG. 1.

Meanwhile, the carrier as the candidate for the cell reselection to be notified in the SIB5 of the macro cell is assumed to be the carrier at 3.5 GHz shown in FIG. 1. In other words, the small cells are operated on the carrier as the candidate for the cell reselection.

The mobile station UE receives the SIB5 transmitted from the macro radio base station Macro eNB and acquires information on the cell or the carrier as the candidate for the cell reselection.

Here, the mobile station UE determines whether or not the information notifies that the carrier as the candidate for the cell reselection is the carrier on which only the "stand-alone cell or cells" are present, on the basis of the information.

When the mobile station UE determines that the carrier as the candidate for the cell reselection is notified as the carrier on which only the "stand-alone cell or cells" are present, the mobile station UE detects the PSS/SSS and then receives the MIB/SIB in step S604.

Here, if the mobile station UE establishes the connection to the small cell, the mobile station UE establishes the connection by the same method as the one used in the case of the ordinary (conventional) "stand-alone cell."

On the other hand, when the mobile station UE determines that the carrier as the candidate for the cell reselection is not notified as the carrier on which only the "stand-alone cell or cells" are present, the mobile station UE receives the control signals corresponding to the MIB/SIB of the small cell on the carrier in step S603 through the individual control signal, the broadcast information, and the like from the macro cell.

Here, if the mobile station UE establishes the connection to the small cell, the mobile station UE establishes the connection on the basis of the individual control signal from the macro radio base station Macro eNB.

According to the mobile communication system of the fifth modified example, the mobile station UE can determine whether the cell on the carrier, on which the small cell is deployed, is the "stand-alone cell" or the "macro-assisted cell" on the basis of the SIB5 transmitted from the macro radio base station Macro eNB.

As a consequence, a particular small cell can be operated both as the "stand-alone cell" and as the "macro-assisted cell" by changing the content of notification by (the information element in) the SIB5 transmitted by the macro radio base station Macro eNB.

In the above example, the macro cell provided by the macro radio base station Macro eNB and the "stand-alone cell" provided by the small radio base station Small eNB have been described as if they were of different types. Instead, the macro cell provided by the macro radio base station Macro eNB may be the cell of the same type as the "stand-alone cell" provided by the small radio base station Small eNB.

In the latter case, the cell can be operated as the macro cell as described above, and can also be operated as the small cell serving as the "stand-alone cell."

(Sixth Modified Example)

A mobile communication system according to a sixth modified example of the present invention will be described with reference to FIG. 17, while focusing on differences from the above-described mobile communication system according to the first embodiment.

In the mobile communication system according to the sixth modified example, the small radio base station Small eNB switches the small cell so as to be operated either as the "stand-alone cell" or as the "macro-assisted cell" depending on an operation status of the macro cell under control of the macro radio base station Macro eNB.

An operation of the small radio base station Small eNB of the sixth modified example will be described below with reference to FIG. 17.

Figure 17:
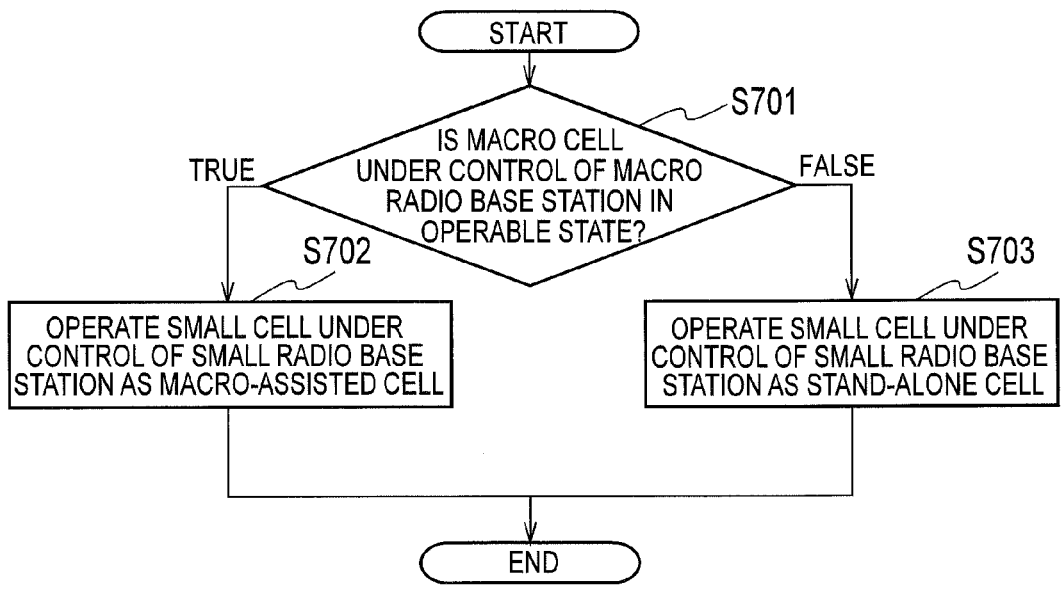
FIG. 17 is a flowchart showing an operation of a small radio base station according to a sixth modified example of the present invention.

As shown in FIG. 17, in step S701, the small radio base station Small eNB determines whether or not the macro cell under control of the macro radio base station Macro eNB is in an operable state.

When the macro cell under control of the macro radio base station Macro eNB is determined to be in the operable state, the small radio base station Small eNB switches the small cell under its control so as to be operated as the "macro-assisted cell" in step S702.

On the other hand, when the macro cell under control of the macro radio base station Macro eNB is determined to be not in the operable state, the small radio base station Small eNB switches the small cell under its control so as to be operated as the "stand-alone cell" in step S703.

The features of this embodiment described above may be expressed as follows.

A first feature of the embodiment is summarized as a mobile station UE used in a mobile communication system provided with a macro cell and a small cell, where the small cell is any of a "stand-alone cell (first cell)" capable of being operated independently of the macro cell and a "macro-assisted cell (second cell)" incapable of being operated independently of the macro cell, the mobile station UE including: a reception unit configured to detect a "discovery signal (prescribed signal)" transmitted by the small cell; and a control unit 22 configured to determine whether a sequence in the "discovery signal" is a sequence for the "stand-alone cell" or a sequence for the "macro-assisted cell." Here, when the sequence in the "discovery signal" is determined as the sequence for the "stand-alone cell", the control unit 22 is configured to start communication in the small cell on the basis of MIB/SIB (broadcast information) of the small cell, and when the sequence in the "discovery signal" is determined as the sequence for the "macro-assisted cell", the control unit 22 is configured to start the communication in the small cell on the basis of a control signal from the macro cell.

A second feature of the embodiment is summarized as a mobile station UE used in a mobile communication system provided with a macro cell and a small cell, where the small cell is any of a "stand-alone cell" capable of being operated independently of the macro cell and a "macro-assisted cell" incapable of being operated independently of the macro cell, the mobile station UE including: a reception unit 21 configured to detect a PSS/SSS (synchronization signal) transmitted by the small cell; and a control unit 22 configured to determine whether a sequence in the PSS/SSS is a sequence for the "stand-alone cell" or a sequence for the "macro-assisted cell." Here, when the sequence in the PSS/SSS is determined as the sequence for the "stand-alone cell", the control unit 22 is configured to start communication in the small cell on the basis of MIB/SIB of the small cell, and when the sequence in the PSS/SSS is determined as the sequence for the "macro-assisted cell", the control unit 22 is configured to start the communication in the small cell on the basis of a control signal from the macro cell.

A third feature of the embodiment is summarized as a mobile station UE used in a mobile communication system provided with a macro cell and a small cell, where the small cell is any of a "stand-alone cell" capable of being operated independently of the macro cell and a "macro-assisted cell" incapable of being operated independently of the macro cell, the mobile station UE including: a reception unit 21 configured to detect a PSS/SSS transmitted by the small cell, and then to receive a new signal (prescribed signal) transmitted by using a subframe which is the same as or located at the periphery of a subframe of the PSS/SSS; and a control unit 22 configured to determine whether the small cell is the "stand-alone cell" or the "macro-assisted cell" on the basis of a content of notification by the new signal. Here, when the small cell is determined as the "stand-alone cell", the control unit 22 is configured to start communication in the small cell on the basis of MIB/SIB of the small cell, and when the small cell is determined as the "macro-assisted cell", the control unit 22 is configured to start the communication in the small cell on the basis of a control signal from the macro cell.

A fourth feature of the embodiment is summarized as a mobile station UE used in a mobile communication system provided with a macro cell and a small cell, where the small cell is any of a "stand-alone cell" capable of being operated independently of the macro cell and a "macro-assisted cell" incapable of being operated independently of the macro cell, the mobile station UE including: a reception unit 21 configured to detect a PSS/SSS transmitted by the small cell, and then to receive a "discovery signal (prescribed signal)"; and a control unit 22 configured to determine whether a sequence in the "discovery signal" is a sequence for the "stand-alone cell" or a sequence for the "macro-assisted cell." Here, when the sequence in the "discovery signal" is determined as the sequence for the "stand-alone cell", the control unit 22 is configured to start communication in the small cell on the basis of MIB/SIB of the small cell, and when the sequence in the "discovery signal" is determined as the sequence for the "macro-assisted cell", the control unit 22 is configured to start the communication in the small cell on the basis of a control signal from the macro cell.

A fifth feature of the embodiment is summarized as a mobile station UE used in a mobile communication system provided with a macro cell and a small cell, where the small cell is any of a "stand-alone cell" capable of being operated independently of the macro cell and a "macro-assisted cell" incapable of being operated independently of the macro cell, the mobile station UE including: a reception unit 21 configured to receive MIB (broadcast information) transmitted by the small cell; and a control unit 22 configured to determine whether the small cell is the "stand-alone cell" or the "macro-assisted cell" on the basis of a content of notification by the MIB. Here, when the small cell is determined as the "stand-alone cell", the control unit 22 is configured to start communication in the small cell on the basis of SIB (rest of the broadcast information) of the small cell, and when the small cell is determined as the "macro-assisted cell", the control unit 22 is configured to start the communication in the small cell on the basis of a control signal from the macro cell.

A sixth feature of the embodiment is summarized as a mobile station UE used in a mobile communication system provided with a macro cell and a small cell, where the small cell is any of a "stand-alone cell" capable of being operated independently of the macro cell and a "macro-assisted cell" incapable of being operated independently of the macro cell, the mobile station UE including: a control unit 22 configured to determine whether or not SIB5 (specific broadcast information) of the macro cell notifies that a carrier for cell reselection is a carrier on which only the "stand-alone cell" is present. Here, when the control unit 22 determines that SIB5 notifies that the carrier for the cell reselection is the carrier on which only the "stand-alone cell" is present, the control unit 22 is configured to perform the cell reselection of the cell on the carrier, and then to start communication in the cell on the basis of MIB/SIB (broadcast information) of the cell, and when the control unit 22 determines that SIB5 does not notify that the carrier for the cell reselection is the carrier on which only the "stand-alone cell" is present, the control unit 22 is configured to start the communication with the cell on the carrier on the basis of a control signal from the macro cell.

A seventh feature of the embodiment is summarized as a small radio base station Small eNB configured to manage a small cell, where the small cell under control of the small radio base station Small eNB is any of a "stand-alone cell" capable of being operated independently of a macro cell under control of a macro radio base station Macro eNB and a "macro-assisted cell" incapable of being operated independently of the macro cell, the small radio base station Small eNB including: a transmission unit 11 configured to transmit a "discovery signal (prescribed signal)". Here, the transmission unit 11 is configured to use a sequence for the "stand-alone cell" as a sequence in the "discovery signal" when the small cell under control of the small radio base station Small eNB is operated as the "stand-alone cell", and to use a sequence for the "macro-assisted cell" as the sequence in the "discovery signal" when the small cell under control of the small radio base station Small eNB is operated as the "macro-assisted cell".

Here, the determination as to whether the above-described small cell is operated by using the "macro-assisted cell" or the "stand-alone cell" may be made by the small radio base station Small eNB alone, by the macro radio base station Macro eNB alone, or in cooperation with each other, and on the basis of statuses of the nearby cells (operating statuses of the radio base stations eNB, the degree of congestion of the cells, the number of the located or connected mobile stations UE, and so forth). Hence, the switching between the "macro-assisted cell" and the "stand-alone cell" may be performed automatically.

Meanwhile, when the small cell is switched from the "stand-alone cell" to the "macro-assisted cell," the mobile station UE having been connected to the small cell may be subjected to release processing from the small cell (a handover to another cell, transition to another RAT, restriction control, or IDLE transition).

Moreover, a request regarding the switching between the "macro-assisted cell" and the "stand-alone cell" may be received from a core network or a mobile station.

A eighth feature of the embodiment is summarized as a communication control method for a mobile station UE usable in a mobile communication system provided with a macro cell and a small cell, where the small cell is any of a "stand-alone cell" capable of being operated independently of the macro cell and a "macro-assisted cell" incapable of being operated independently of the macro cell, the method including: a first step of detecting a "discovery signal (prescribed signal)" transmitted by the small cell; a second step of determining whether a sequence in the "discovery signal" is a sequence for the "stand-alone cell" or a sequence for the "macro-assisted cell"; and a third step of starting communication in the small cell. Here, when the sequence in the "discovery signal" is determined as the sequence for the "stand-alone cell" in the second step, the communication in the small cell is started in the third step on the basis of MIB/SIB (broadcast information) of the small cell, and when the sequence in the "discovery signal" is determined as the sequence for the "macro-assisted cell" in the second step, the communication in the small cell is started in the third step on the basis of a control signal from the macro cell.

A ninth feature of the embodiment is summarized as a small radio base station Small eNB configured to manage a small cell, where the small cell is any of a "stand-alone cell" capable of being operated independently of a macro cell under control of a macro radio base station Macro eNB and a "macro-assisted cell" incapable of being operated independently of the macro cell. Here, the small radio base station switches the small cell so as to be operated as any one of the "stand-alone cell" and the "macro-assisted cell" depending on an operation status of the macro cell.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-167507 (filed on Jul. 27, 2012) is incorporated by reference in the present specification.

INDUSTRIAL APPLICABILITY

As described above, according to the present invention, it is possible to provide a mobile station, a small radio base station, and a communication control method, which are capable of realizing a "macro-assisted cell" adaptable to multiple operation modes.

EXPLANATION OF THE REFERENCE NUMERALS

Macro eNB macro radio base station
Small eNB small radio base station
UE mobile station
111, 23, 31 transmission unit
112, 21, 32 reception unit
22 control unit

The invention claimed is:

1. A mobile station used in a mobile communication system provided with a macro cell and a small cell, where the small cell is any of a first cell capable of being operated independently of the macro cell and a second cell incapable of being operated independently of the macro cell, the mobile station comprising:
   a reception unit configured to detect a prescribed signal transmitted by the small cell; and
   a control unit configured to determine whether a sequence in the prescribed signal is a sequence for the first cell or a sequence for the second cell, wherein
   when the sequence in the prescribed signal is determined as the sequence for the first cell, the control unit is configured to start communication in the small cell on the basis of broadcast information of the small cell, and
   when the sequence in the prescribed signal is determined as the sequence for the second cell, the control unit is configured to start the communication in the small cell on the basis of a control signal from the macro cell.

2. A mobile station used in a mobile communication system provided with a macro cell and a small cell, where the small cell is any of a first cell capable of being operated independently of the macro cell and a second cell incapable of being operated independently of the macro cell, the mobile station comprising:
   a reception unit configured to detect a synchronization signal transmitted by the small cell; and
   a control unit configured to determine whether a sequence in the synchronization signal is a sequence for the first cell or a sequence for the second cell, wherein
   when the sequence in the synchronization signal is determined as the sequence for the first cell, the control unit is configured to start communication in the small cell on the basis of broadcast information of the small cell, and
   when the sequence in the synchronization signal is determined as the sequence for the second cell, the control unit is configured to start the communication in the small cell on the basis of a control signal from the macro cell.

3. A mobile station used in a mobile communication system provided with a macro cell and a small cell, where the small cell is any of a first cell capable of being operated independently of the macro cell and a second cell incapable of being operated independently of the macro cell, the mobile station comprising:
   a reception unit configured to detect a synchronization signal transmitted by the small cell, and then to receive a prescribed signal transmitted by using a subframe which is the same as or located at the periphery of a subframe of the synchronization signal; and
   a control unit configured to determine whether the small cell is the first cell or the second cell on the basis of a content of notification by the prescribed signal, wherein
   when the small cell is determined as the first cell, the control unit is configured to start communication in the small cell on the basis of broadcast information of the small cell, and
   when the small cell is determined as the second cell, the control unit is configured to start the communication in the small cell on the basis of a control signal from the macro cell.

4. A mobile station used in a mobile communication system provided with a macro cell and a small cell, where the small cell is any of a first cell capable of being operated independently of the macro cell and a second cell incapable of being operated independently of the macro cell, the mobile station comprising:
   a reception unit configured to detect a synchronization signal transmitted by the small cell, and then to receive a prescribed signal; and
   a control unit configured to determine whether a sequence in the prescribed signal is a sequence for the first cell or a sequence for the second cell, wherein
   when the sequence in the prescribed signal is determined as the sequence for the first cell, the control unit is configured to start communication in the small cell on the basis of broadcast information of the small cell, and
   when the sequence in the prescribed signal is determined as the sequence for the second cell, the control unit is configured to start the communication in the small cell on the basis of a control signal from the macro cell.

5. A mobile station used in a mobile communication system provided with a macro cell and a small cell, where the small cell is any of a first cell capable of being operated independently of the macro cell and a second cell incapable of being operated independently of the macro cell, the mobile station comprising:
   a reception unit configured to receive broadcast information transmitted by the small cell; and
   a control unit configured to determine whether the small cell is the first cell or the second cell on the basis of a content of notification by the broadcast information, wherein
   when the small cell is determined as the first cell, the control unit is configured to start communication in the small cell on the basis of the rest of the broadcast information of the small cell, and when the small cell is determined as the second cell, the control unit is configured to start the communication in the small cell on the basis of a control signal from the macro cell.

6. A mobile station used in a mobile communication system provided with a macro cell and a small cell, where the small cell is any of a first cell capable of being operated independently of the macro cell and a second cell incapable of being operated independently of the macro cell, the mobile station comprising:

a control unit configured to determine whether or not specific broadcast information of the macro cell notifies that a carrier for cell reselection is a carrier on which only the first cell is present, wherein when the control unit determines that the specific broadcast information notifies that the carrier for the cell reselection is the carrier on which only the first cell is present, the control unit is configured to perform the cell reselection of the cell on the carrier, and then to start communication in the cell on the basis of broadcast information of the cell, and when the control unit determines that the specific broadcast information does not notify that the carrier for the cell reselection is the carrier on which only the first cell is present, the control unit is configured to start the communication with the cell on the carrier on the basis of a control signal from the macro cell.

7. A communication control method for a mobile station usable in a mobile communication system provided with a macro cell and a small cell, where the small cell is any of a first cell capable of being operated independently of the macro cell and a second cell incapable of being operated independently of the macro cell, the method comprising:

a first step of detecting a prescribed signal transmitted by the small cell;

a second step of determining whether a sequence in the prescribed signal is a sequence for the first cell or a sequence for the second cell; and a third step of starting communication in the small cell, wherein when the sequence in the prescribed signal is determined as the sequence for the first cell in the second step, the communication in the small cell is started in the third step on the basis of broadcast information of the small cell, and when the sequence in the prescribed signal is determined as the sequence for the second cell in the second step, the communication in the small cell is started in the third step on the basis of a control signal from the macro cell.

* * * * *